(12) United States Patent
Lysaght

(10) Patent No.: US 6,810,335 B2
(45) Date of Patent: Oct. 26, 2004

(54) QUALIFIER

(75) Inventor: Richard G. Lysaght, Hicksville, OH (US)

(73) Assignee: C.E. Electronics, Inc., Bryan, OH (US)

( * ) Notice: Subject to any disclaimer, the term of this patent is extended or adjusted under 35 U.S.C. 154(b) by 0 days.

(21) Appl. No.: 10/397,538

(22) Filed: Mar. 26, 2003

(65) Prior Publication Data

US 2003/0212534 A1 Nov. 13, 2003

Related U.S. Application Data

(63) Continuation-in-part of application No. 09/804,109, filed on Mar. 12, 2001, now Pat. No. 6,567,754.

(51) Int. Cl.$^7$ ................................. G01L 1/00
(52) U.S. Cl. ................... 702/41; 702/190; 702/138; 702/44
(58) Field of Search ................... 702/190, 41, 44, 702/138

(56) References Cited

U.S. PATENT DOCUMENTS

| | | |
|---|---|---|
| 4,791,838 A | 12/1988 | Bickford |
| 4,864,903 A | 9/1989 | Bickford et al. |
| 5,592,396 A | 1/1997 | Tambini et al. |
| 5,689,434 A | 11/1997 | Tambini et al. |
| 5,937,370 A | 8/1999 | Lysaght |
| 6,055,484 A | 4/2000 | Lysaght |
| 6,567,754 B1 | 5/2003 | Lysaght |

Primary Examiner—John Barlow
Assistant Examiner—Anthony T. Dougherty
(74) Attorney, Agent, or Firm—Emch, Schaffer, Schaub & Porcello Co., L.P.A.

(57) ABSTRACT

This qualifier uses multiple thresholds and multiple timers to perform its operations. This assembly qualifier is a counting apparatus that monitors either the pressure of a pulsing air tool. The qualifier includes a microprocessor that is configured to indicate a pulsing region when the measured air pressure is between the third stored air pressure and the fourth stored air pressure.

6 Claims, 10 Drawing Sheets

QUALIFIER

This application is a continuation-in-part of Ser. No. 09/804,109 filed Mar. 12, 2001 now U.S. Pat. No. 6,567,754.

TECHNICAL FIELD

This invention relates to a tool monitor and assembly qualifier that verifies that the correct number of fasteners have been properly installed into an assembly. When used in conjunction with a pneumatic pulse tool, pneumatic tool, electric tool, or mechanical click wrench containing a mechanical clutch or torque switch, proper fastener installation and count can be verified. The device monitors an analog signature created by a tools internal pressure, current flow or voltage and has the ability to "learn" the analog curve's characteristics during the assembly process.

BACKGROUND OF THE INVENTION

U.S. Pat. Nos. 6,055,484 and 5,937,370 represent a recent, significant development in the field of tool monitoring and assembly qualifying. The programmed microprocessor is configured to identify a portion of the signal representative of the analog signal corresponding to a completed cycle. The configuration also allows for identification of an incomplete cycle and a multiple counting of a completed cycle (double-hit). A completed cycle occurs when a tool drives a fastener to completion causing the tool's mechanical clutch or torque switch to end the cycle. An incomplete cycle occurs when a tool drives a fastener and the clutch or torque switch is not allowed to complete the cycle by turning the tool off, meaning that the proper torque is never reached. A double-hit occurs when a tool drives a fastener that has previously been tightened to the target torque. The qualifiers and disclosures of U.S. Pat. Nos. 6,055,484 and 5,937,370 are herein incorporated by reference.

In the previous invention, the programmed microprocessor is configured to identify and store the parameter of a first period of time for the analog signal to attain an initial predetermined range. The microprocessor also is configured to identify and store the parameter of a first period of time for the analog signal to attain an initial predetermined range. The microprocessor also is configured to identify and store a second period of time for the analog signal to attain a second predetermined range. The qualifier quite nicely tells if a fastener is put in properly and if the clutch or torque switch has fired indicating that a fastening process is complete.

BRIEF SUMMARY OF THE INVENTION

The next generation qualifier uses multiple thresholds and multiple timers to perform its operations. This assembly qualifier is a counting apparatus that monitors either the pressure of a pneumatic tool, the current flow through an electric tool, or the switch closure of a torque switch on a mechanical wrench to determine if the tool's clutch has shut the tool off indirectly confirming that the target torque has been reached. The qualifier also determines if some unknown means shut off the tool besides the clutch. For example, the system detects proper fastening, nuisance trips, double hits, fasteners that are too short, fasteners that are too long, the use or nonuse of washers, effective or non-effective pulsing, and proper clutch shut off. The microprocessor may also be configured to identify and store a third period of time for the analog signal to attain a third predetermined range. This version makes use of up to four thresholds and five timers in order to accomplish its qualification of an assembly process.

This system for monitoring analog signatures comprised of a means to convert air pressure, electrical current, or a switch closure into an electrical signal representative of the aforementioned pressure, current, or switch closure, a means for electrically computationally processing the electrical signal into another signal representing at least one parameter corresponding to a condition of the tool being monitored which is a function of the analog signal, and a programmed microprocessor configured to identify a portion of the analog signal corresponding to the parameter. The programmed microprocessor is configured to identify and store the parameter of a first threshold analog signal to begin monitoring and storing the parameter of a cycle. Next, the programmed microprocessor is configured to identify and store the parameter of a second analog level of the tool driving the fastener to its target torque and configured to identify and store the parameter of a third analog level to count a completed cycle when the measured analog signal is in the same as the third identified and stored parameter. Finally, the programmed microprocessor is configured to identify and store the parameter of a fourth analog level which indicates the shut off region of the cycle when the measured analog signal is above the fourth identified and stored parameter.

Certain pulse pneumatic have an internal mechanical device that regulates (governs) the incoming air supply. Because of this, the pneumatic signature can "fool" the qualifier by creating a signal that would satisfy all of the timers and thresholds even though the tool was in reverse or running in the air and not tightening a fastener at all.

With these particular pneumatic tools the difference between a "good" run-down and the other anomalies were the pulses. Even though the other qualification methods were used to insure that the pressure was in a window where it was considered to be pulsing, that logic was not sufficient in this case.

This invention is a pulse counting algorithm that knows how to identify individual pulses. When the unit is in cycle and collecting data, the algorithm determines if the current data point being sampled is in the region (between the thresholds) where pulsing is expected to occur. If it is, a pulse width worth of samples leading up to the point are retrieved from memory. A variable referred to as a DELTA represents the minimum peak to valley differential the algorithm is willing to accept as a pulse. The algorithm analyzes the data point that would be the center of the data that has been pulled from memory. The algorithm looks to see if there are data points that are the value DELTA less than the point that is being analyzed on both sides of the data point within the pulse width worth of data that is being analyzed. If there are, this point is considered to be a positive pulse.

A count of all the positive pulses is kept during a rundown and this pulse count is compared to the desired number of pulses at the end of the run.

At the end of the run, if all criteria are met including timers, thresholds, and number of pulses, then the fastening is considered good.

DETAILED DESCRIPTION OF THE INVENTION

Figure 1:
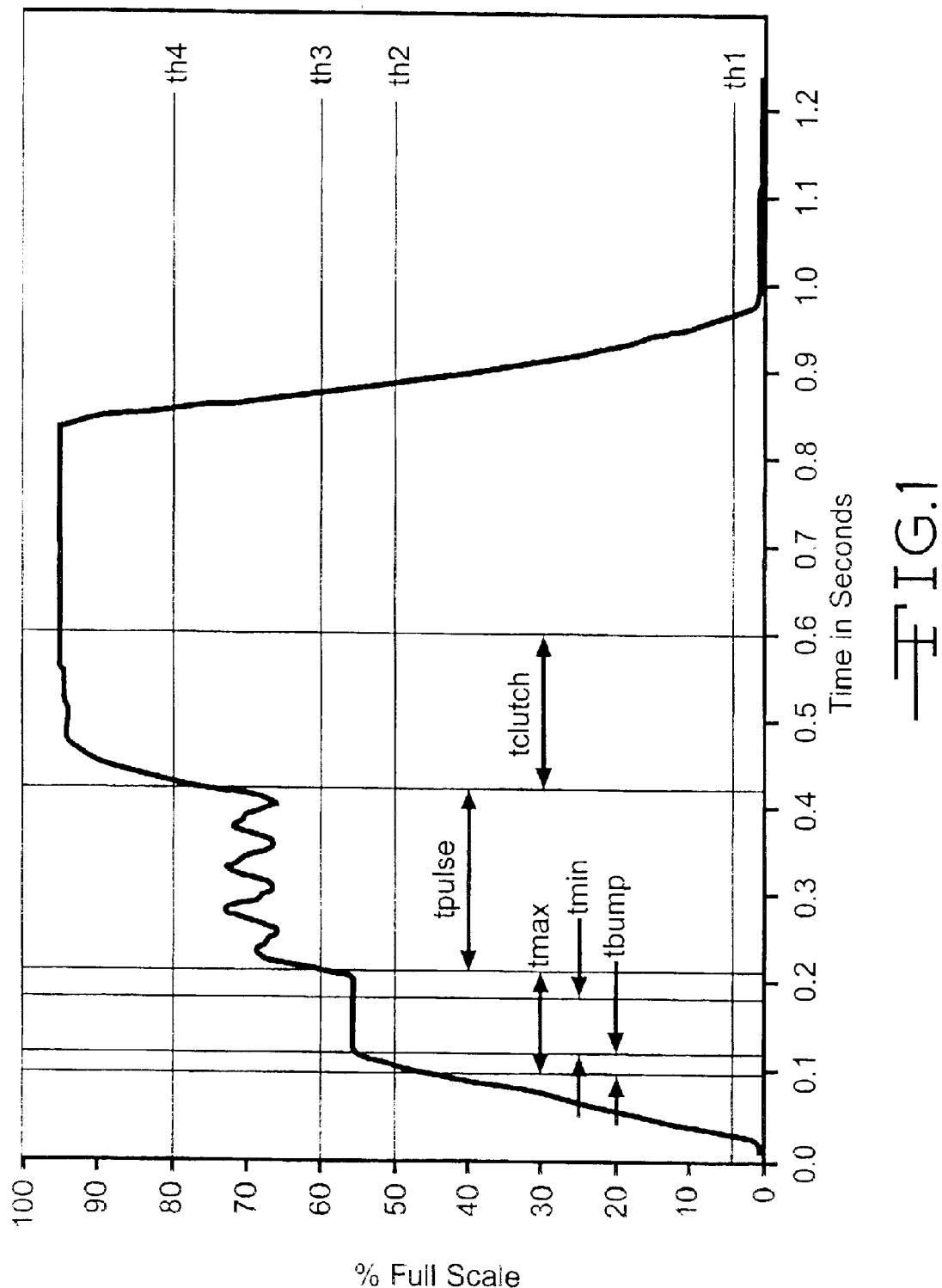
FIG. 1 shows the signature for a conventional pneumatic pulse tool monitored according to this invention.

FIG. 1 is the pneumatic signature of a pulse tool. The system monitors a compressed air driven tool by a means for measuring air pressure between the tool's trigger and its pneumatic motor. This air pressure is converted into an electrical signal and the pre-programmed microprocessor is configured to determine if the electrical signal has met the requirements set forth by the thresholds and timers.

The signature or graph shows three distinct regions.

The rundown region which occurs at 55 PSI

The pulsing region which occurs around 68 PSI

The clutch shut-off region that occurs at 94 PSI

Four thresholds are drawn onto the graph and labeled TH1, TH2, Th3, and TH4. TH1 is a threshold used by the control to know when the tool is in cycle. The threshold will be just above the noise floor. As soon as the signal rises above that threshold, the qualifier will begin monitoring and storing data.

When the signal level passes TH2 but remains below TH3 the qualifier will consider the tool to be in the run-down region. Three timers are used in this region.

Tbump will be used to ignore nuisance trips. If the tool does not run longer than Tbump without the clutch firing, it is ignored.

Tmin is the minimum time that the signal must remain in the run-down phase. Tmin will catch double-hits, fasteners that are too short for the process, and can also recognize if a washer was used and was not supposed to be.

Tmax sets the maximum amount of time the tool can remain in the run-down phase. Tmax will enable the qualifier to reject fasteners that are too long for the process and also detect missing washers.

When the signal enters the region between TH3 and TH4, it will consider the tool to be in the pulsing region. The timer Tpulse will be associated with this region. Pulse tools are ineffective if they are not allowed to pulse at least 3 or 4 times. Tpulse will set a minimum amount of time that the tool must remain in the pulsing region guaranteeing that the mechanical torque adjustment on the tool will be effective.

The final threshold (TH4) sets the region above which the signal will be considered to have clutched out. The signal will have to remain in that region for a time greater than Tclutch.

Figure 2:
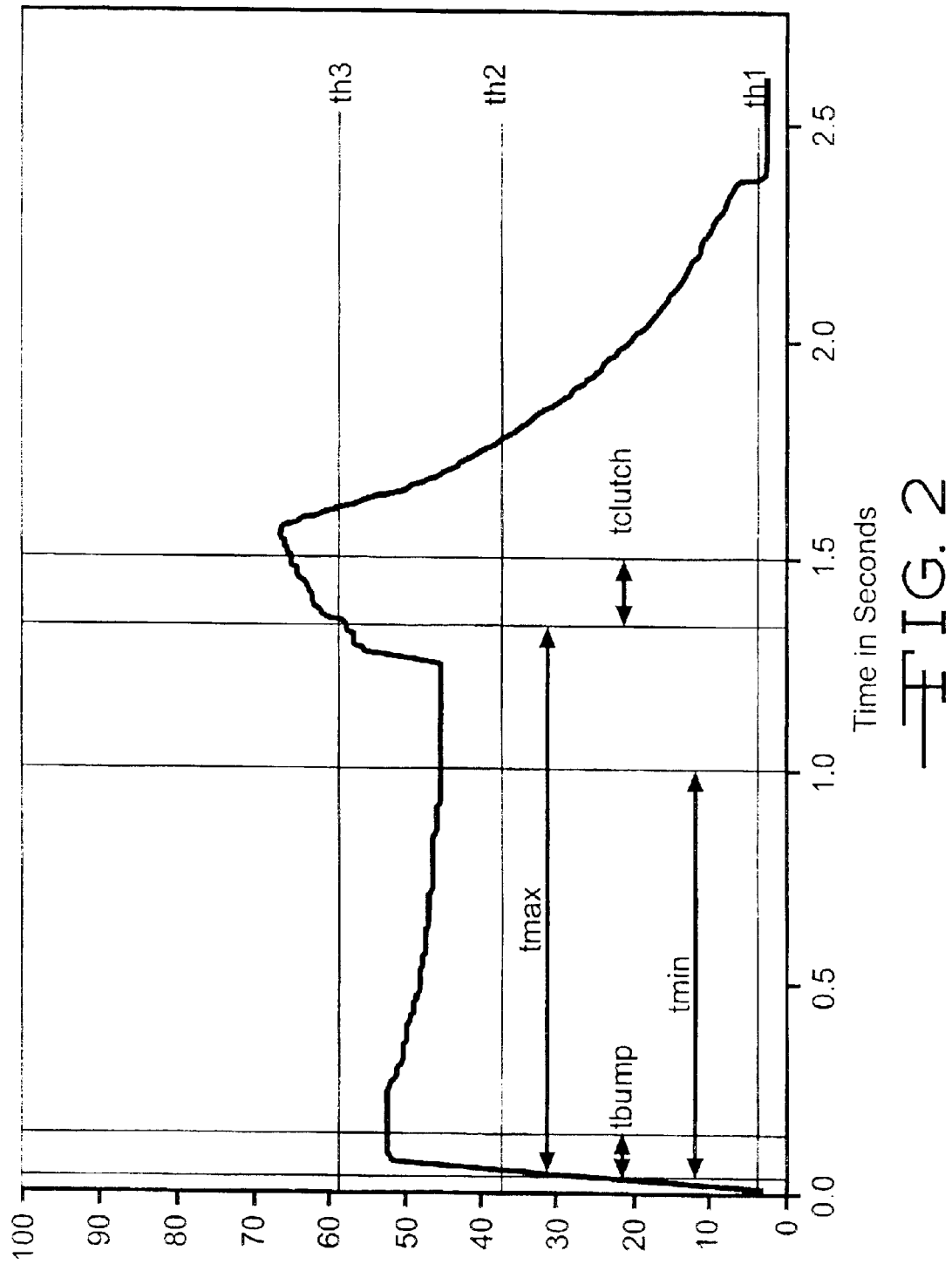
FIG. 2 shows the signature for a conventional pneumatic direct drive tool monitored according to this invention.

FIG. 2 is the pneumatic signature of a direct drive tool. The system monitors a compressed air driven tool by a means for measuring air pressure between the tool's trigger and its pneumatic motor. This air pressure is converted into an electrical signal and the pre-programmed microprocessor is configured to determine if the electrical signal has met the requirements set forth by the thresholds and timers.

The signature of the graph shows two distinct regions.

The run-down region at 45–50 PSI.

The clutched out region at 60 PSI and above.

The qualifier will use three thresholds and four timers in order to qualify this type of signature. TH1 will set the noise floor. Once the signal rises above this level, the qualifier will start monitoring the process and storing data.

When the signal enters the region between TH2 and TH3, the qualifier will consider the tool to be in the run-down phase.

Tbump will be used to ignore nuisance trips. If the tool does not run longer than Tbump without clutching out, it is ignored.

Tmin is the minimum time that the signal must remain in the run-down phase. Tmin will catch double-hits, fasteners that are too short for the process, and can also recognize if a washer was used and was not supposed to be.

Tmax sets the maximum amount of time the tool can remain in the run down phase. Tmax will enable the qualifier to reject fasteners that are too long for the process and also detect missing washers.

Once the signal rises above TH3, the qualifier will determine that the tool has clutched out. Timer Tclutch will determine if the signal was in this region long enough.

Figure 3:
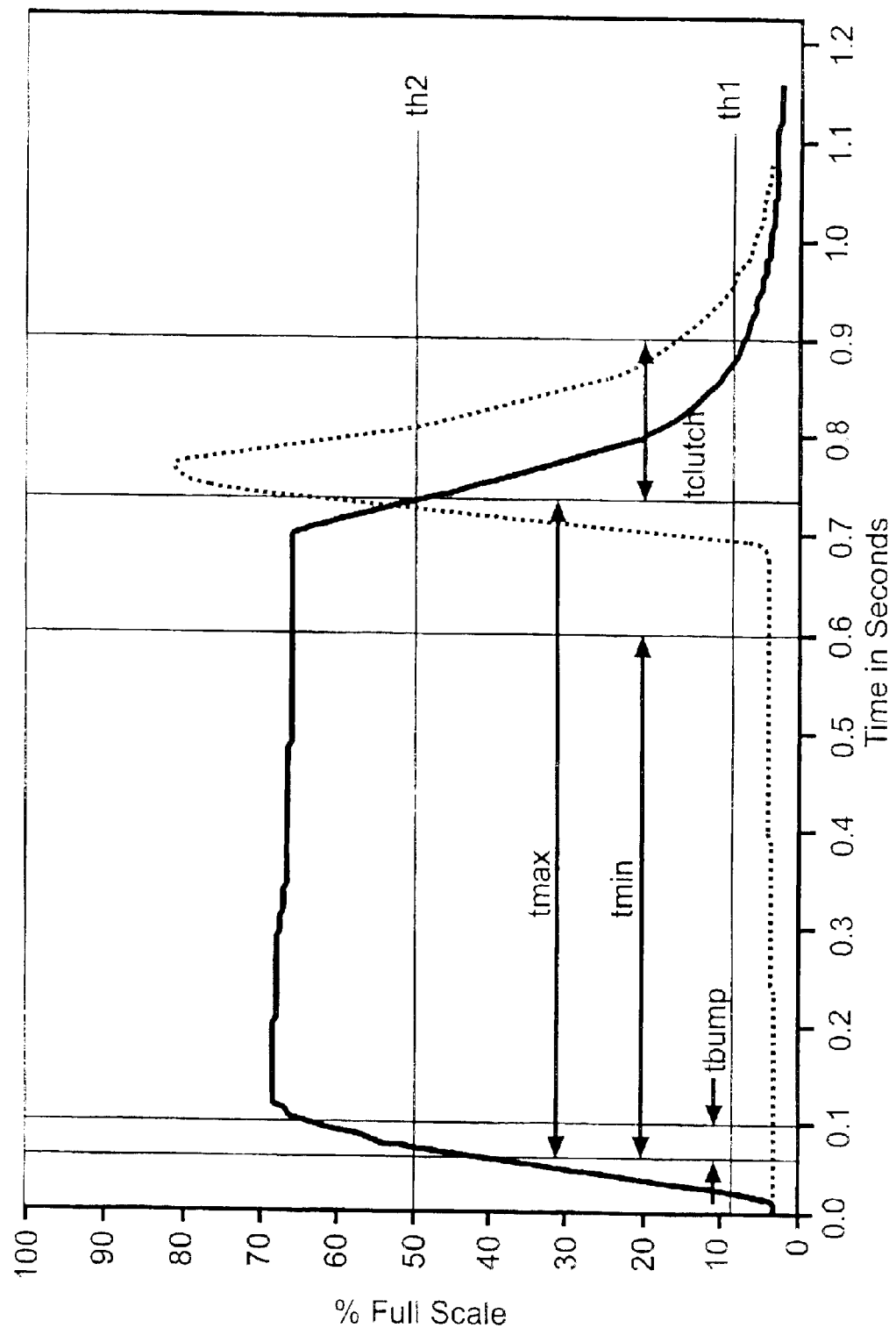
FIG. 3 shows the signature for a conventional electrical tool monitored according to this invention.

FIG. 3 is the current signature of an electric tool. The system monitors an electrically driven tool having a forward or reverse current flow through the tool by employing a current transducer for measuring and converting the forward and reverse currents into electrical signals.

By using these electrical signals., a pre-programmed microprocessor is configured to determine if the electrical signal has met the requirements set forth by the thresholds and timers.

There are two phases in this fastening process. The solid line depicts the run-down phase and the dashed line depicts the inductive spike, which is indicative of the clutch turning the tool off.

Two thresholds and four timers will qualify this type of signature. TH1 will set the noise floor above which, the qualifier will start monitoring the process and recording data.

When the signal rises above TH2, the qualifier will consider the tool to be in the run-down phase. Three timers will be employed during the run-down phase.

Tbump will be used to ignore nuisance trips. If the tool does not run longer than Tbump without clutching out, it is ignored.

Tmin is the minimum time that the signal must remain in the run-down phase. Tmin will catch double-hits, fasteners that are too short for the process, and can also recognize if a washer was used and was not supposed to be.

Tmax sets the maximum amount of time the tool can remain in the run down phase. Tmax will enable the qualifier to reject fasteners that are too long for the process and also detect missing washers.

Once the signal drops back below TH2, the qualifier will start looking for an inductive spike, which is indicative of the tool's clutch stopping the tool when torque is achieved. If the spike occurs before Tclutch expires, the signature will be considered good.

Figure 4:
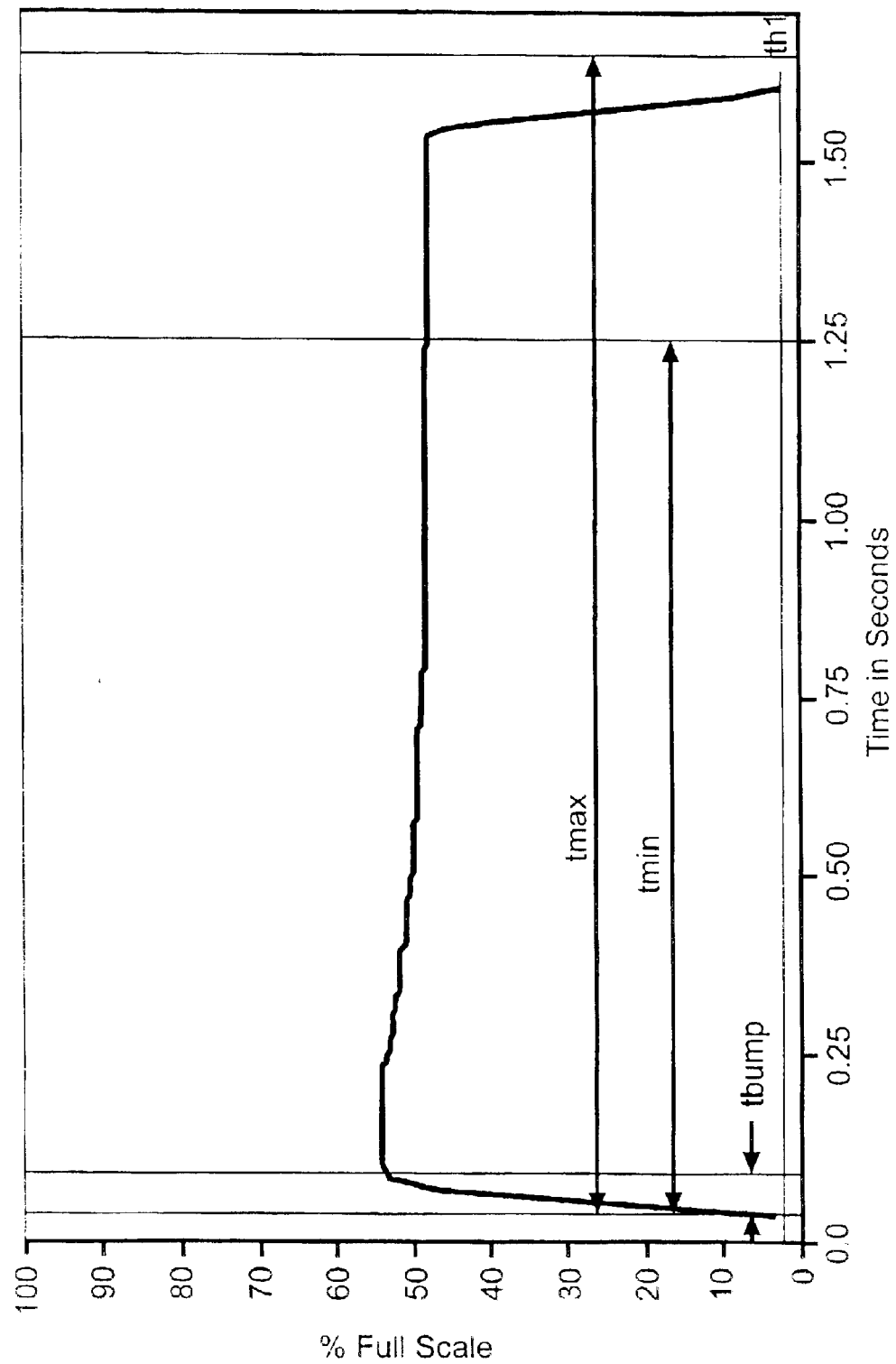
FIG. 4 shows the signature for a conventional RF tool, click wrench or pneumatic push to start tool monitored according to this invention.

FIG. 4 may be the signature for a pneumatic push to start tool, an RF tool, or a click wrench. In the case of the RF tool and click wrench, a switch closure indicates when torque is met. With the RF tool, the switch closure initiates an RF transmission, which is detected by the qualifier. The click wrenches switch closure sends out a voltage, which is read by the qualifier. The qualifier uses a pressure transducer to detect the presence or absence of pressure within a push to start tool.

In all three cases (RF, click wrench, or push to start tool) the signal is converted to an electrical signal, which is either on or off. A pre-programmed microprocessor is configured to determine if the electrical signal has met the requirements set forth by the thresholds and timers.

One threshold (TH1) and three timers are employed to qualify this signature.

Once the signature rises above the noise floor (TH1), it will be considered in cycle and three timers will be started.

Tbump will be used to ignore nuisance trips. If the tool does not run longer than Tbump, it is ignored.

Tmin is the minimum time that the signal must remain in the run-down phase. In the case of the push to start Tmin will catch double-hits, fasteners that are too short for the process and can also recognize if a washer was used and was not supposed to be. Tmin is also the minimum time that an RF tool or click wrench must be held after the torque switch is asserted.

Tmax sets the maximum amount of time the tool can remain in the run down phase. In the case of the push to start tool Tmax will enable the qualifier to reject fasteners that are too long for the process and also detect missing washers. Tmax will keep users from applying too much torque to a fastener in the case of an RF or click-wrench.

FIGS. 1–4 have a vertical axis measured in 0/0 Full Scale because the current device monitors an analog signature representative of air pressure, current flow, torque and the like. The Scale represents pressure, torque or voltage. In FIGS. 1 and 2, the Scale represents—to 100 psi. In FIG. 3, the Scale represents current flow or voltage. In FIG. 4, the Scale represents air pressure or voltage.

Figure 5:
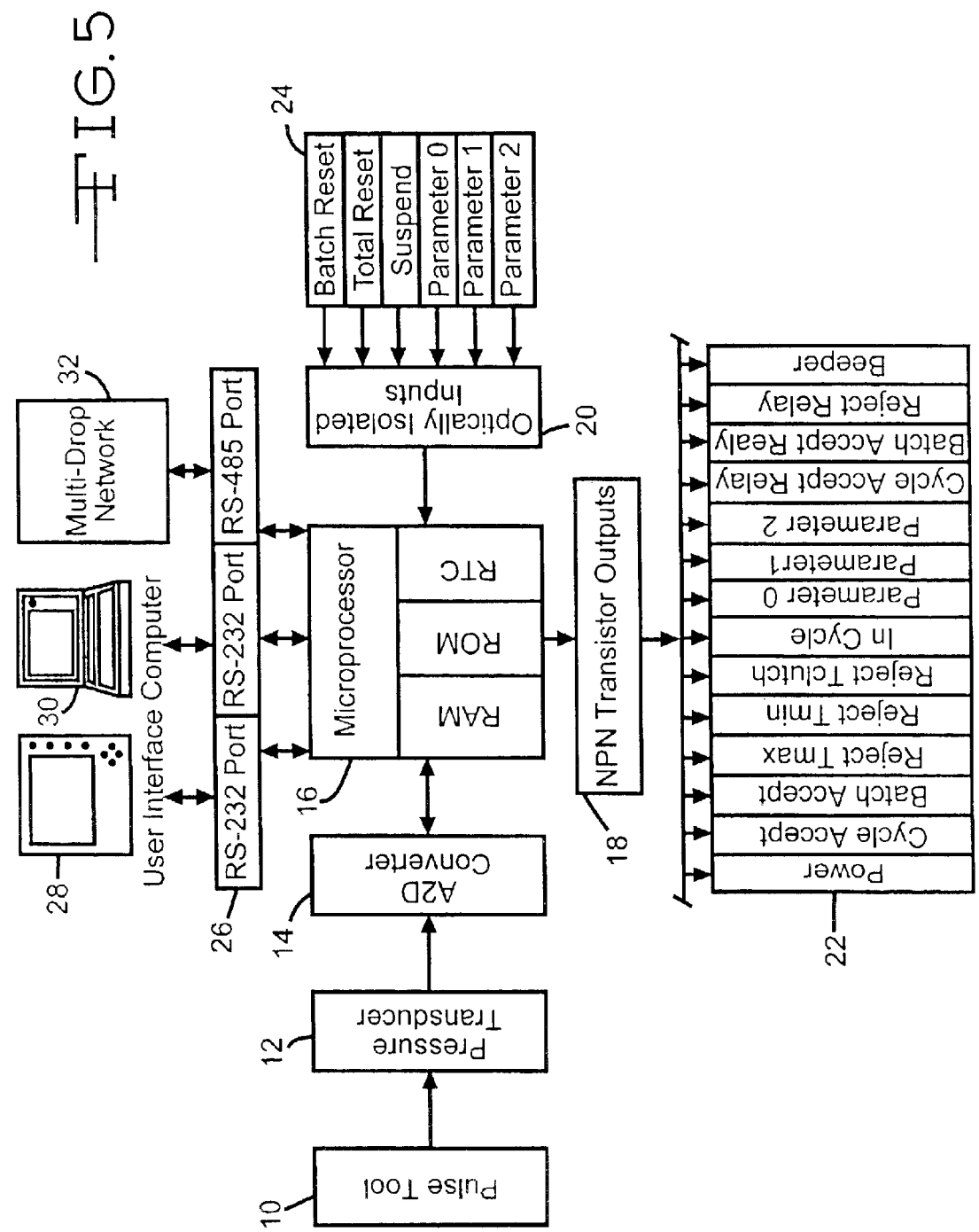
FIG. 5 is a diagram for monitoring a conventional pneumatic pulse tool according to this invention.

FIG. 5 illustrates a pulse tool qualifier according to this invention. FIG. 1 shows pneumatic pulse tool 10 connected to pressure transducer 12. Transducer 12 measures air pressure between tool 10's trigger and pneumatic motor and converts the pressure to electrical signals. A/D convert 14 receives the electrical signal from transducer 12 and coverts them in to binary code for use by microprocessor 16. NPN transistor outputs 18 and optically isolated inputs 20 represent the measured parameter of this invention. Output 18 maybe any of listed outputs 22 and input 20 may be any of listed outputs 24. Ports 26 connect the system to conventional hardware such as user interface 218, computer 30 and network 32.

Figure 6:
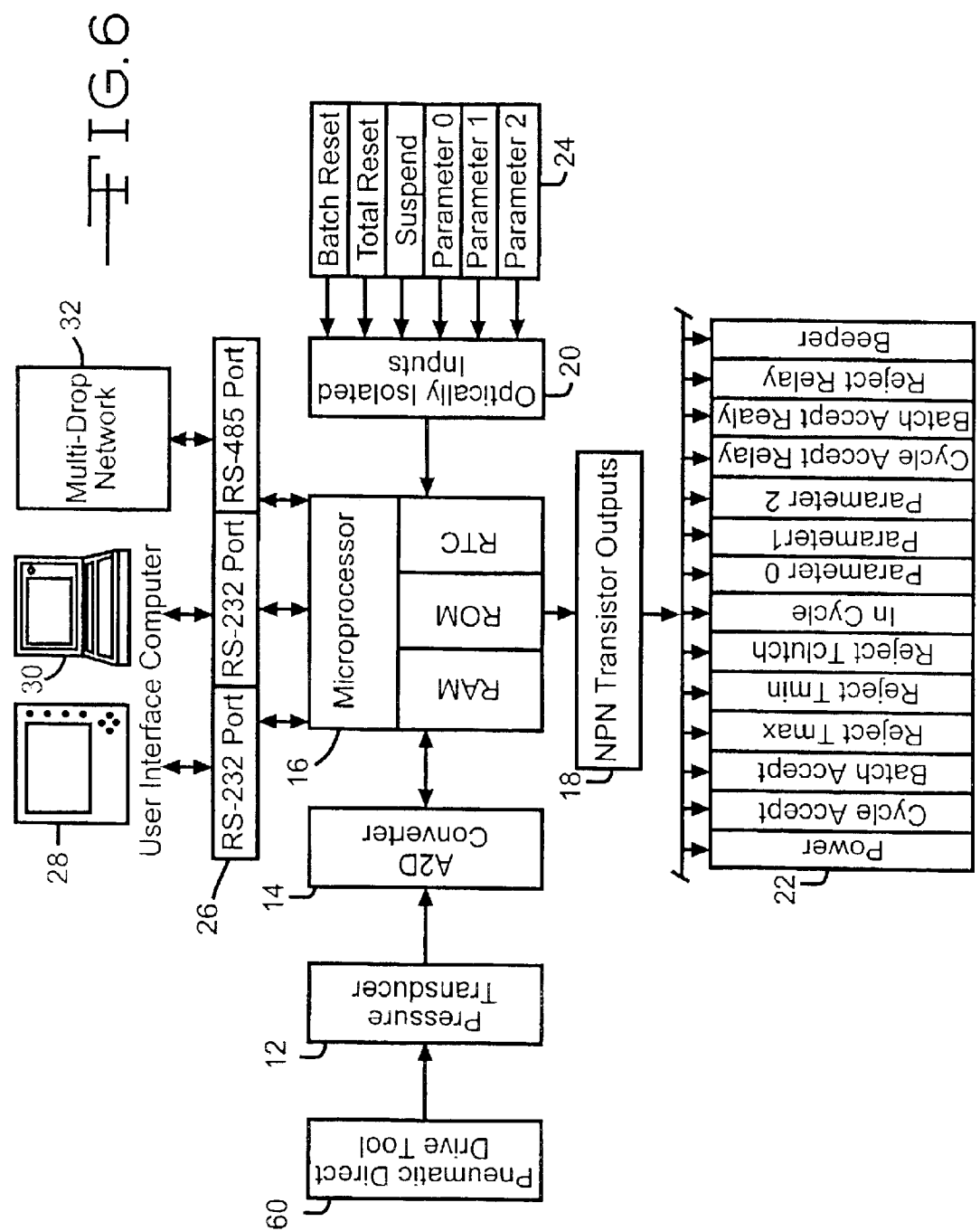
FIG. 6 is a diagram for monitoring pneumatic direct drive tool according to this invention.

FIG. 6 illustrates a pneumatic direct drive qualifier according to this invention. The illustration is the same as FIG. 5 except for pneumatic direct drive tool 60.

Figure 7:
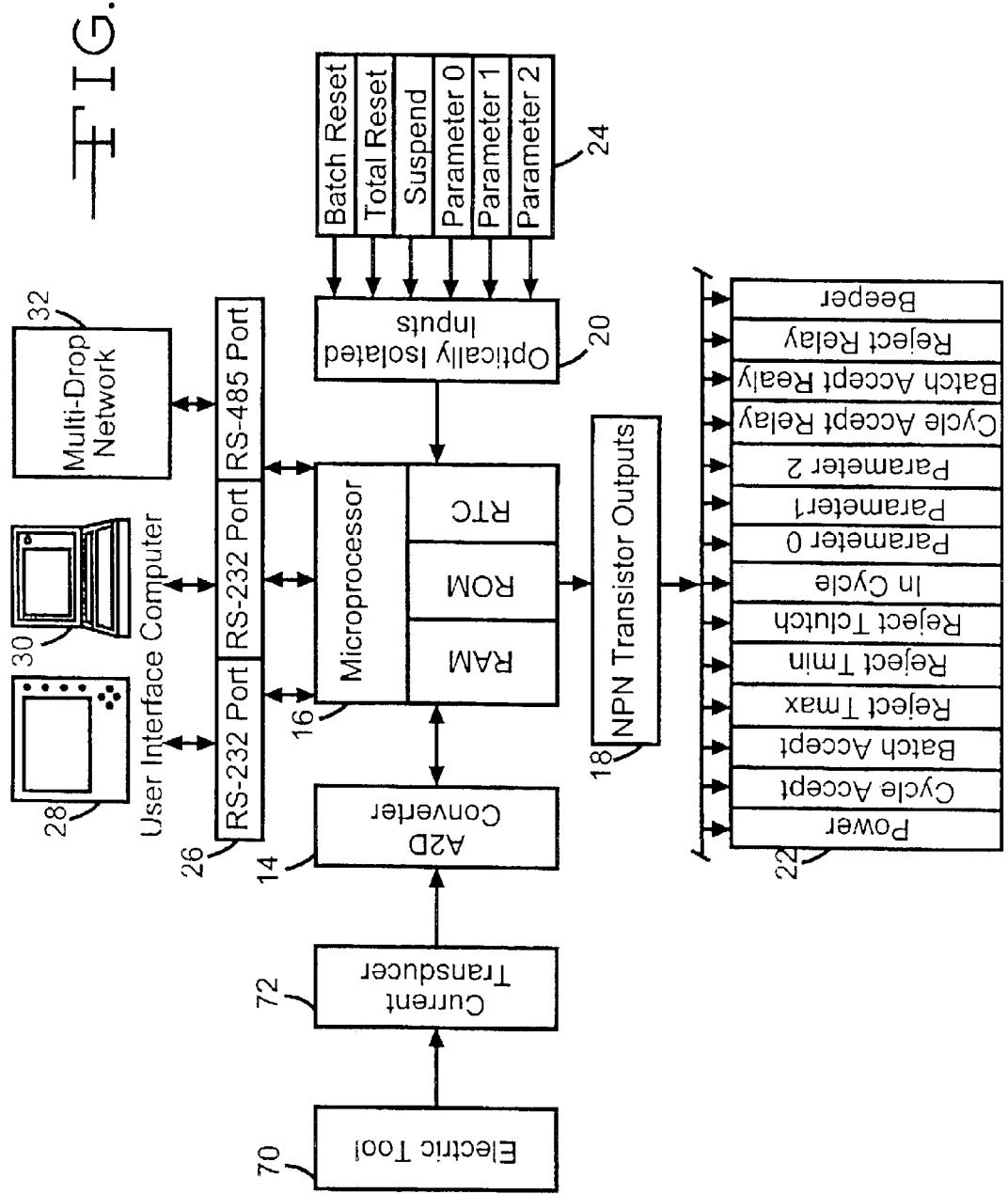
FIG. 7 is a diagram for monitoring an electric tool according to this invention.

FIG. 7 illustrates an electric tool qualifier according to this invention. The illustration is the same as FIG. 5 except for electric tool 70 and current transducer 72. Transducer 72 converts forward or reverse currents into electrical signals for A/D converter 14.

Figure 8:
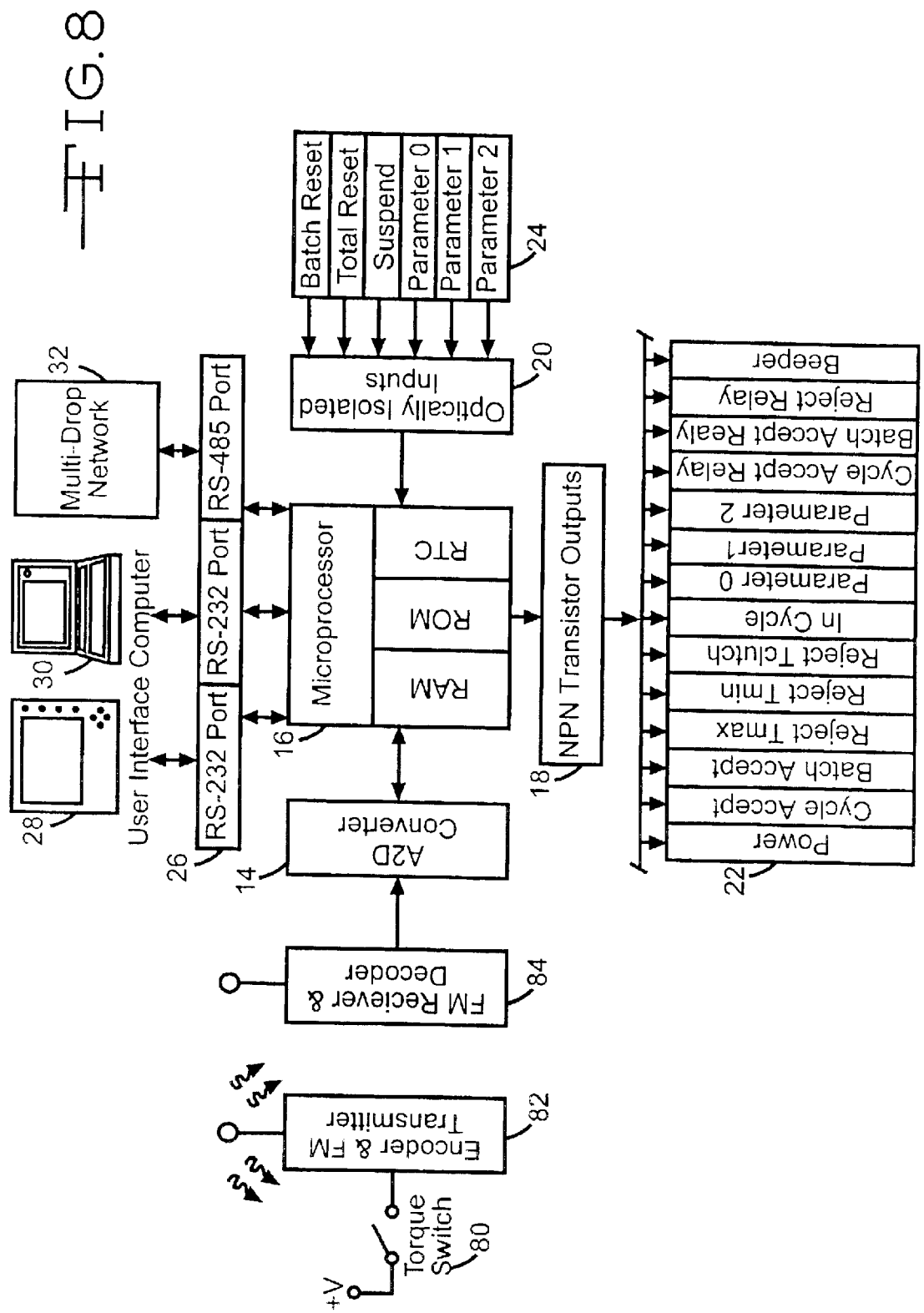
FIG. 8 is a diagram for monitoring an RF controlled tool according to this invention.

FIG. 8 illustrates an RF qualifier according to this invention. FIG. 8 shows torque switch 80 connected to encoder FM transmitter 82. A switch 80 closure indicates torque is met. Switch 80 closures initiates an RF transmission from transmitter 82 to FM receiver and decoder 84. A/D converter 14 receives an electrical signal from receiver 84 and converts them into binary code for use by microprocessor 16. The remainder of the illustration is the same as FIG. 5.

Figure 9:
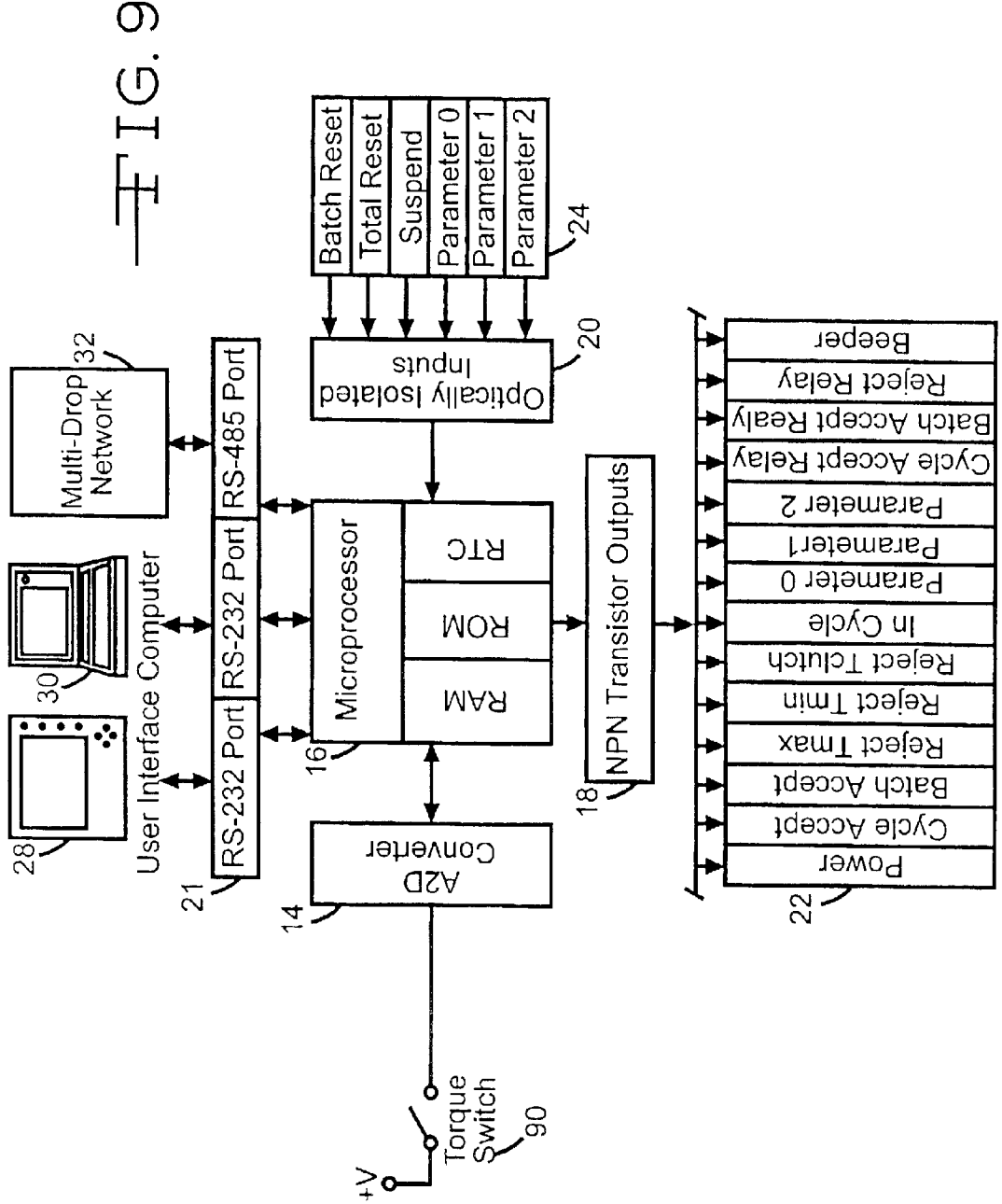
FIG. 9 is a diagram for monitoring a tool having a torque switch according to this invention.

FIG. 9 illustrates a torque switch qualifier such as that used in click wrenches. The clock wrenches include torque switch 90. Switch 90 closure indicates torque has been met. Switch 90's closure sends out a voltage which A/D converter 14 converts into binary code for microprocessor 16. The qualifier then follows the procedure of FIG. 5.

Figure 10:
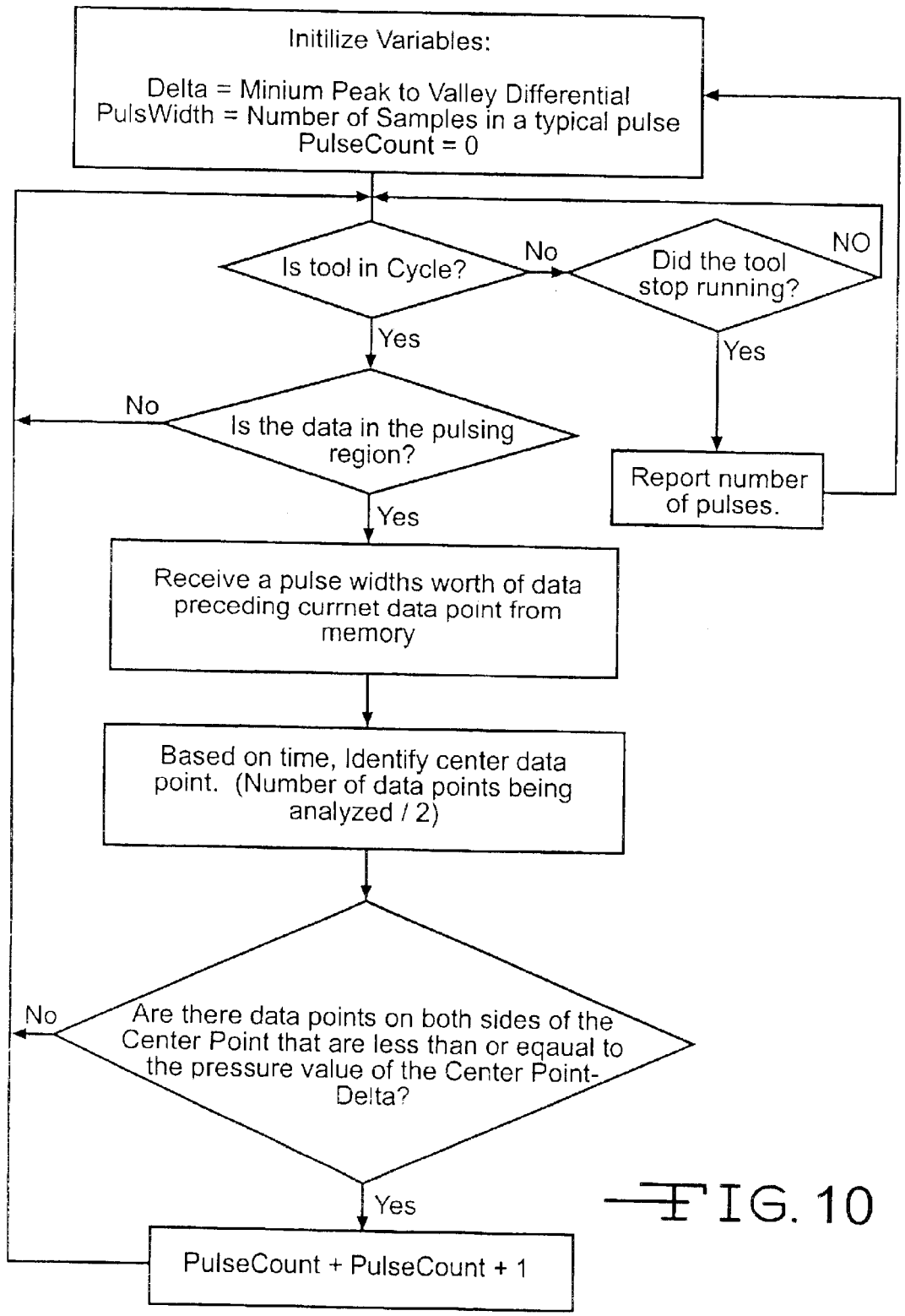
FIG. 10 is a flow chart showing the process steps for the pulse counting algorithm according to this invention.

FIG. 10 shows the pulse counting algorithm according to this invention. This flow chart represents software that knows how to identify individual pulses. When the unit is in cycle and collecting data the software determines if the current data point being sampled is in the region (between the thresholds) where pulsing is expected to occur. If it is, a pulse width worth of samples leading up to the point are retrieved from memory. A variable referred to as DELTA represent the minimum peak to valley differential the software is willing to accept as a pulse. The software analyzes the data point that would be the center of the data that has been pulled from memory. The software also looks to see if there are data points that are the value DELTA less than the point that is being analyzed on both sides of the data point within the pulse width worth of data that is being analyzed. If there are, this point is considered to be a positive pulse. A count of all the positive pulses is kept during a rundown and this pulse count is compared to the desired number of pulses at the end of the run. At the end of the run, if all criteria are met including timers, thresholds, and number of pulses, then the fastening is considered good.

In addition to these embodiments, persons skilled in the art can see that numerous modifications and changes may be made to the above invention without departing from the intended spirit and scope thereof.

I claim:

1. A system for monitoring a compressed air driven, pulse tool comprising:

a means for measuring air pressure between the trigger of a pneumatic pulse tool and the motor and converting the air pressure into an electrical signal representative of the air pressure;

a means for electrically computationally processing the electrical signal into another signal representative at least one parameter corresponding to a condition of the tool being monitored which is a function of air pressure;

a programmed microprocessor configured to identify a portion of the signal representative of the air pressure corresponding to the parameter;

wherein the programmed microprocessor is configured to identify and store the parameter of a first threshold air pressure to begin monitoring the parameter of a cycle;

wherein the programmed microprocessor is configured to identify and store the parameter of a second air pressure to identify a portion of the signal representative of the air pressure of the tool driving a fastener to its target torque;

wherein the programmed microprocessor is configured to identify and store the parameter of a third air pressure to count a completed cycle when the measured air pressure is in the same as the third identified and stored parameter;

wherein the programmed microprocessor is configured to identify and store the parameter of a fourth air pressure to indicate a shut off region of the cycle when the measured air pressure is above the fourth identified and stored parameter;

wherein the microprocessor is configured to indicate a pulsing region when the measured air pressure is between the third stored air pressure and the fourth stored air pressure; and wherein the programmed microprocessor is configured to confirm that the measured air pressure is in the pulsing region.

2. A system according to claim 1 wherein the programmed microprocessor is configured to identify and store the parameter of a minimum peak to valley differential pulse width when the measured air pressure is between the third identified and stored parameter and the fourth identified and stored parameter.

3. A system according to claim 1 wherein the microprocessor is configured to retrieve a pulse widths worth of data preceding the current measured air pressure from the stored parameter.

4. A system according to claim 3 wherein the microprocessor is configured to identify a center data point from the stored parameter, based on time.

5. A system according to claim 4 wherein the microprocessor is configured to identify if data points are on both sides of the center point that are less than or equal to the pressure value of the center point.

6. A system according to claim 5 wherein the microprocessor is configured to report a number of pulses in the measured air pressure.

* * * * *